United States Patent
Marazzani et al.

(12)

(10) Patent No.: US 6,402,990 B1
(45) Date of Patent: *Jun. 11, 2002

(54) METHOD FOR REHABILITATIVE AND/OR PROTECTIVE CORROSION-INHIBITION OF REINFORCING STEEL EMBEDDED IN A HARDENED STRUCTURE BY MEANS OF SURFACE-APPLIED CORROSION-INHIBITING COMPOSITIONS

(75) Inventors: Beat Marazzani, Oberengstringen; Theodor A. Bürge, Geroldswil; Urs Mäder, Frauenfeld, all of (CH)

(73) Assignee: Sika AG, Vorm, Kaspar Winkler & Co. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,290

(22) Filed: May 11, 1999

(30) Foreign Application Priority Data

May 13, 1998 (EP) .............................................. 98108660

(51) Int. Cl.⁷ ............................ C23F 11/00; C09K 3/10
(52) U.S. Cl. .............................. 252/389.31; 252/389.1; 252/390; 106/14.05; 106/14.12; 106/14.13; 106/14.14; 106/14.15; 106/14.16; 106/14.17; 106/14.18; 106/14.41; 106/14.42; 106/14.43
(58) Field of Search ................ 106/14.05, 14.12–14.18, 106/14.41, 14.42, 14.43; 252/389.1, 389.3, 390, 389.31

(56) References Cited

U.S. PATENT DOCUMENTS 5,032,317 A * 7/1991 Bartlett
5,422,141 A   6/1995 Hoopes et al.
5,556,915 A * 9/1996 Suzuki et al.

FOREIGN PATENT DOCUMENTS

EP    0 635 463    1/1995
WO    96/27695     9/1996

* cited by examiner

*Primary Examiner*—Tae H. Yoon
(74) *Attorney, Agent, or Firm*—Burns, Doane, Swecker & Mathis, L.L.P.

(57) ABSTRACT

The present invention provides methods and compositions for the reduction of the corrosion rate of already corroding steel reinforcements embedded in a hardened concrete structure as well as for the protective corrosion inhibition of uncorroded steel reinforcements embedded in a hardened concrete structure exposed to aggressive environments.

The inventive new compositions employed for the novel method are essentially based on one or more amino- and/or hydroxyalkylamino compound(s), which are partially or completely neutralized with one or more inorganic acid(s) and/or derivatives thereof and/or aliphatic carboxylic- and/or aromatic carboxylic acid(s), one or more surfactant(s) and one or more water-based or water-thinnable water repellent agent(s) selected from the group of organosilicones.

18 Claims, No Drawings

METHOD FOR REHABILITATIVE AND/OR PROTECTIVE CORROSION-INHIBITION OF REINFORCING STEEL EMBEDDED IN A HARDENED STRUCTURE BY MEANS OF SURFACE-APPLIED CORROSION-INHIBITING COMPOSITIONS

FIELD OF THE INVENTION

The present invention is related to the inhibition of corrosion of reinforcing steel embedded in a hardened concrete structure. In particular, this invention provides compositions and a method for the reduction of the corrosion rate of already corroding steel reinforcements embedded in a hardened concrete structure as well as for the protective corrosion inhibition of uncorroded steel reinforcements embedded in a hardened concrete structure exposed to aggressive environments.

BACKGROUND OF THE INVENTION

Durability limitations of steel reinforced concrete are well documented. Corrosive environments (e.g. the presence of chlorides), carbonation of concrete structures, poor workmanship and other factors can quickly cause corrosion of the reinforcing steel. Chloride ions in concrete can originate from the ingress of de-icing salts, seawater or air-borne salts, diffusing to the reinforcement through the pore network of concrete, as well as from contaminated aggregates or from contaminated mixing water (cast in chlorides).

Carbon dioxide as well as other acidic corrodents present in the air react with the free alkali contained in concrete. Over a period of time the pH value of the outermost concrete layer decreases, resulting in a reduction of the natural protection of the steel embedded in reinforced concrete.

Normally, reinforcing steel embedded in concrete is protected because the concrete cover acts as a barrier and the high pH value of the pore fluid assures a passive state. Both the presence of chloride ions at concentrations above a given threshold level and carbonation can put reinforcing steel into an active state and result in corrosion rates that markedly decrease the expected service lives of reinforced concrete structures. Thousands of bridges and other structures made of reinforced concrete need to be repaired worldwide as a consequence of corrosion of the steel reinforcement.

The present invention relates to corrosion-inhibiting compositions for the rehabilitative repassivation of corroded reinforcing steel embedded in hardened concrete as well as for the precautionary, protective corrosion inhibition of uncorroded reinforcing steel embedded in hardened concrete structures exposed to corrosive environments. Said corrosion-inhibiting compositions contain corrosion inhibitors with high buffer capacities as well as water repellent agents, and cause a reduction of the corrosion rate of corroding reinforcing steel embedded in a hardened concrete structure as well as delay the onset of corrosion of uncorroded reinforcing steel embedded in a hardened concrete structure respectively.

Corrosion inhibitors are compounds or compositions that, when added in small concentrations to a corrosive environment, decrease the corrosion rate. The use of corrosion inhibitors is wide-spread and well established. For example protection systems based on corrosion inhibitors are used to limit the corrosion of process equipment such as cooling systems, pipelines, or central heating systems. Various types of corrosion inhibitors designed for different applications are available in the marketplace. Corrosion inhibitors may be classified into the following groups: Anodic oxidizing passivators (e.g. chromates, nitrites), anodic non-oxidizing passivators (e.g. molybdates), cathodic corrosion inhibitors (e.g. oxygen scavengers such as sulfites or cathodic poisons such as arsenates), film-forming inhibitors of the adsorption type (e.g. amines, alkanolamines). The film-forming corrosion inhibitors, which are typically organic compounds, represent the largest group of corrosion inhibitors and may exhibit anodic, cathodic or mixed behaviour.

THE PRIOR ART

Several methods have been suggested to protect reinforcing steel embedded in concrete against corrosion:

World Pat. Appl. No. 96/22951 (Berke et al.) discloses a corrosion-inhibiting admixture for hydraulic cement compositions. Said admixture is based on an anodic corrosion inhibitor such as calcium nitrite and a cathodic corrosion inhibitor such as calcium stearate or other organic acids of high molecular weights ($C_7$ to $C_{21}$) including salts and esters thereof.

U.S. Pat. No. 5,262,089 (Bobrowski et al.) discloses an admixture for inhibiting the chloride-induced corrosion of steel reinforcements in concrete. Said admixture is based on an emulsion containing an ester of an unsaturated fatty acid, a surfactant and a saturated fatty acid ester as well as a saturated fatty acid, an amphoteric compound, a glycol and a soap; the admixture is added to the concrete prior to placement.

PCT Patent application Ser. No. 96/27695 (Curatolo et al.) describes a method of controlling effectively chloride-induced corrosion of steel reinforcement members in concrete by the addition of a corrosion-inhibiting admixture to freshly prepared concrete. Said admixture comprises i) one or more waterproofing agents; ii) one or more mono-, di-, or trialkanolamines and iii) optionally, one or more additional corrosion-inhibiting agents, with the proviso that if the waterproofing agent is capable of forming a salt with ii) and/or iii), then at least a portion of i) and ii) and/or iii) are present in said admixture in their salt form in combination with each other.

Swiss Pat. No. 686 368 (Buerge at al.) is related to corrosion-inhibiting admixtures for cementitious building materials which are containing metal parts, e.g. metallic reinforcements. Said admixtures are based on reaction products of amino compounds with one or more inorganic and/or organic acids. The admixtures may contain excessive amounts of the amino compound and/or un-reacted amino- and acid compounds.

According to the four patents above, corrosion inhibitors of the admixture type are added to concrete prior to placement, thus prior to hardening. None of these prior art methods, however, discloses a rehabilitative and/or protective application of corrosion-inhibiting compositions to the surface of a hardened, reinforced concrete structure. U.S. Pat. No. 5,435,846 (Tatematsu et al.) discloses a cement additive for inhibiting concrete deterioration. Said cement additive contains a powder mixture of inorganic ion exchangers as well as optionally nitrite ions. It inhibits the alkali-aggregate reaction and the corrosion of reinforcing steel, thereby protecting concrete from deterioration. Also disclosed is a method of inhibiting or repairing concrete deterioration, comprising charging or applying a cement composition to a concrete crack or to a concrete body whose surface has peeled or been damaged.

However, said method of coating and/or patching damaged concrete structures with a cementitious material is labor-intensive and costly, as well as (regarding patching applications) limited to restorations of not fair-faced concrete structures.

Canadian Pat. No. 1,258,473 (Martin et al.) describes a method of inhibiting corrosion of iron or steel reinforcements in concrete which comprises incorporating in a slurry of the concrete an effective quantity of a corrosion-inhibiting composition having as its major ingredient a water-soluble hydroxyalkylamine having a molecular weight in the range of about 48 to about 500. An additional method relates to placing a concrete slurry containing said hydroxyalkylamine in corrosion-inhibiting proximity to said reinforcement members embedded in cured concrete structures.

This method relates to corrosion-inhibiting compositions of the concrete admixture type. Said corrosion-inhibiting compositions are mixed with concrete before placing the concrete to either cast or to repair reinforced concrete structures. According to the patent it is not intended to use a solution of said corrosion-inhibiting compositions to impregnate the surface of hardened reinforced concrete. Furthermore, many low to medium molecular weight types of hydroxyalkylamines are featuring disadvantages such as strong ammonia-like odours, high alkalinity and corrosiveness.

U.S. Pat. No. 4,609,573 (Omata et al.) describes a process for inhibiting corrosion of steel built in an inorganic material by applying in a first step an aqueous solution of calcium nitrite, in a second step an aqueous solution of lithium silicate and optionally, in a third step, a cement composition containing a polymer dispersion (e.g. a styrene/butadiene rubber dispersion) to the surface of said inorganic material. Claimed corrosion inhibitors: only inorganic compounds such as calcium nitrite, sodium nitrite, tricalcium phosphate, sodium chromate. Said solution gradually penetrates the inorganic material by ionic diffusion.

This method shows the following disadvantages: By applying a coat consisting of a polymer dispersion the anyway slow rate of ionic diffusion of the claimed inorganic corrosion inhibitors could be further slowed down. Furthermore the aspect of treated surfaces may alter by top-coating with a cement composition (important regarding fairfaced concrete fronts). Chromates are featuring problematic toxicity data.

U.S. Pat. No. 5,391,349 (Hansen) discloses a method to inhibit the corrosion of ferrousbased metals embedded in concrete containing chlorides by drawing the chlorides away from the metal, (by applying water and electric current) and then applying a composition containing ammonium carbamate or ammonium carbonate to the concrete. Optionally, sodium silicate may be added to the solution.

World Pat. Appl. No. 91/09153 (Hettiarachchi et al.) discloses a method for applying an anti-corrosive agent to a reinforcing bar in a cementitious structure. An electrolyte solution containing an anti-corrosive agent is placed in contact with a surface of the structure, and the agent is drawn into and trough the structure, into contact with the embedded reinforcing bar, by an electric field. Therefore an electrical connection between a first electrode placed in contact with said solution and a second electrode has to be made. The second electrode has to be positioned in the structure and may include the reinforcing member. Said anti-corrosive agent is selected from the groups of tetraalkyl-phosphonium compounds, nitrites or molybdates.

European Pat. Appl. No. 0 723 947 A1 (Guerin) relates to a process for the restoration and protection of reinforced concrete structures. Solutions of alkaline electrolytes containing optionally a hydrophilic compound and/or a surfactant are filled into reservoirs which are installed on the surface of a concrete structure. An electrical connection is provided between external electrodes situated in the reservoirs and the reinforcing steel tL embedded in the concrete. Said electrolytes migrate by osmotic diffusion in direction of the reinforcement.

Disadvantage of the three methods mentioned above: Reservoirs equipped with counter-electrodes have to be installed, which is difficult to perform at structurized concrete surfaces as well as labor-intensive and costly. Furthermore treatments according to said methods may cause undesirable efflorescences. The method according to the European Pat. Appl. No. 0 723 947 A1 is causing a reduction of the corrosion rate of the reinforcement by realkalization, but doesn't make use of the beneficial corrosion-inhibiting effect caused by the addition of corrosion inhibitors.

U.S. Pat. No. 5,326,529 (Miksic et al.) describes a method of inhibiting corrosion of metal reinforcements embedded within cured concrete. The method comprises providing a plurality of exteriorly-accessible uniformly distributed openings in the concrete. In each of these openings a containers having a permeable wall structure and containing an adsorbent material as well as a migrating corrosion inhibitor is placed. The permeable wall structure of the containers allows the corrosion inhibitor to exit the container and to migrate through the concrete to the rebars to thereby inhibit corrosion.

European Pat. Spec. No. 0 305 393 B1 (Banks) relates to a method for inhibiting corrosion of reinforcement of a reinforced porous structure by incorporating in the concrete of a vapour-phase corrosion-inhibitor, characterized in that the inhibitor is inserted in the structure, during or after its formation, and selectively positioned adjacent or in contact with the reinforcement, to cause the inhibitor to migrate through the structure and more particularly along an interface between the structural material and the reinforcement.

The last two methods are featuring a common disadvantage: Before treating a hardened concrete structure according to these methods, a large number of holes has to be drilled into the surface of the concrete structure, which is both labor-intensive and costly, as well as has negative consequences regarding the aspect of fair-faced concrete fronts.

U.S. Pat. No. 5,071,579 (Johnston et al.) describes corrosion-inhibiting systems which comprise at least one of the following compounds: sodium fluorophosphate and a water soluble salt of alkyl- and/or aminoalkyl- and/or N-hydroxyalkylphosphonic acid derivatives sold above. The invention also discloses deicers, paints and other corrosion inhibitors in numerous carriers.

U.S. Pat. No. 4,092,109 (Rosenberg et al.) discloses methods of protecting metal structures in hydraulic cement bridge decking against corrosion comprising applying an agent consisting of calcium nitrite to the bridge decking and to the juncture of the metal structure with the bridge decking respectively.

U.S. Pat. No. 5,422,141 (Hoopes et al.) discloses a rehabilitative solution for preventing or retarding the spread of corrosion of metal reinforcements in concrete, comprising
  a) one or more corrosion-inhibiting agent(s) selected from different groups of chemicats (e.g. nitrites) and
  b) an impregnation-increasing amount of penetration-enhancing agents selected from the group of $C_1$ to $C_{20}$ alcohols, alkali metal salts of gluconic acid, alkyl-substitute benzene compounds or mixtures thereof.

According to the literature underdosages of the anodic corrosion inhibitor nitrite in a reinforced concrete structure contaminated with chlorides may cause the adverse, un-desirable effect of promoting the corrosion of the ferrous reinforcement.

All the prior art methods have at least one of the following disadvantages:

- They comprise corrosion-inhibiting compositions to be added only to fresh concrete.
- They require the drilling of a multitude of holes into the concrete surface. a They require the installation of auxiliary devices like electrodes, reservoirs.
- They are labor-intensive and therefore costly.
- They require the application of electric current. a They comprise inorganic corrosion inhibitors showing only limited rates of diffusion.
- They have the inherent risk of causing undesirable efflorecence.
- They are not very suitable for the restoration of structured concrete surfaces or fair-faced concrete fronts.

None of the prior art methods, however, disclose a rehabilitative and/or protective corrosion inhibition of reinforcing steel embedded in a hardened concrete structure by means of applying an aqueous corrosion-inhibiting composition comprising corrosion-inhibiting compounds as well as organosilicone based water repellent agents to the surface of said concrete structure, featuring in addition to improved anti-corrosion action the following additional advantages:

- of being not labor-intensive
- of implying moderate overall cost of rehabilitative treatment,
- of implying an easy application even on structured concrete surfaces,
- of not influencing the aspect of concrete surface.

DESCRIPTION OF THE INVENTION

Hence, it was an object of this present invention to provide novel compositions being suitable for the reduction of the corrosion rate of already corroding steel reinforcements embedded in a hardened concrete structure as well as for the protective corrosion inhibition of uncorroded steel reinforcements embedded in a hardened concrete structure exposed to aggressive environments whereby said compositions do not display the above pointed out drawbacks.

It was furthermore an object of the present invention to provide a novel method of reducing the corrosion rate of already corroding steel reinforcements embedded in a hardened concrete structure as well as for the protective corrosion inhibition of uncorroded steel reinforcements embedded in a hardened concrete structure exposed to aggressive environments.

It was finally an object of the present invention to use novel compositions based on amino- and/or hydroxyalkylamino compound(s) for a process to reduce the corrosion rate of already corroding steel reinforcements embedded in a hardened concrete structure as well as for the protective corrosion inhibition of uncorroded steel reinforcements embedded in a hardened concrete structure exposed to aggressive environments.

The above objectives were met pursuant to the independent claims. Preferred embodiments are set forth in the dependent claims. Further aspects of the invention could be derived from the description.

Thus, the aqueous corrosion-inhibiting compositions according to the present invention comprise the following components:

a) One or more amino- and/or hydroxyalkylamino compound(s), partially or completely neutralized with one or more inorganic acid(s) and/or derivatives thereof and/or aliphatic carboxylic- and/or aromatic carboxylic acid(s), in an amount sufficient to inhibit corrosion of said steel reinforcement.

b) One or more surfactant(s) providing an enhanced wetting and penetration capability by altering the surface tension is applied in one or more coats to the surface of a hardened reinforced concrete structure which has undergone or is susceptible to corrosion of the reinforcing steel.

c) One or more water-based and/or water-thinnable water repellent agent(s), selected from the group of organosilicone compounds.

By mixing the aqueous corrosion-inhibiting composition consisting of components a) and b) with the further component c), quite surprisingly, an additional protection from rain water and/or from seawater and/or from the ingress of corrosive chemicals can be achieved. It turns out that the presence of component c) provides unexpectedly a markedly improved resistance to the penetration of water, while being permeable to vapor which is quite important within the context of the drying process where the departure of humidity in the form of vapor must not be hindered. Thus, through the improved resistance to the water penetration, the corrosion-inhibition could be significantly improved.

Said hardened concrete, particularly the outermost layer (s) of said hardened concrete in close vicinity of the outermost parts of the reinforcement, may be carbonated to any degree or uncarbonated and/or may contain chloride ions.

The disclosed aqueous surface-applied corrosion-inhibiting impregnations are featuring the ability to reduce the corrosion rates of corroded steel reinforcement embedded in a hardened concrete due to their corrosion-inhibiting action as well as, in the case of a carbonated reinforced concrete structures, by realkalizing the carbonated concrete due to their alkalinities and their high buffer capacities. Additionally the corrosion rate of reinforcing steel, embedded in a hardened concrete structures exposed to moisture, rainfall and/or seawater, is further reduced due to the water repellent action of organosilicone compound(s) blended into said impregnations.

The careful selection of the amino- and/or hydroxyalkylamino compounds as well as of the inorganic acid and/or carboxylic acid compounds allows the formulation of corrosion-inhibiting impregnations with high buffer capacities. When applied on the surface of a carbonated hardened reinforced concrete structure, said corrosion-inhibiting compositions are capable to raise the pH value of the concrete's pore fluid in the vicinity of the reinforcing steel to a level, where the corrosion rate is markedly reduced.

Amines and alkanolamines and salts thereof have the unique feature to move a considerable distance through hardened reinforced concrete because of their physicochemical properties. They interact with the reinforcing steel embedded in the concrete resulting in a protection of the reinforcing steel.

Preferably, combinations of fast-penetrating and slow-penetrating corrosion-inhibiting compounds are selected, having the advantage of combining fast initial action with extended service life. Thus said corrosion-inhibiting composition preferably comprise at least two corrosion-inhibiting compounds, at least one which penetrates relatively quickly and at least one other which penetrates relatively slowly under the conditions to be encountered at building sites.

In accordance with the present invention it was quite unexpectedly found that when certain amino- and/or hydroxyalkylamino compounds are combined with some inorganic acids and/or derivatives thereof and/or carboxylic acids, as well as one or more surfactants b) and water-based or water-thinnable water repellent agents based on organosilicones c) to said composition, not only a corrosion-inhibition of uncorroded reinforcing steel embedded in hardened concrete can be achieved, but the corrosion rate of already corroded reinforcing steel embedded in a hardened concrete structure can be reduced significantly.

Preferably, said amino- and/or hydroxyalkylamino compound(s) of component a) according to this invention is (are) selected from the group comprising:

1-(Ethylamino)-2-propanol
1-(Cyclohexylamino)-2-propanol
3-Amino-1-propanol
2-Aminoethanol
2-(Methylamino)ethanol
2-(Dimethylamino)ethanol
2-(Ethylamino)ethanol
2-(Diethylamino)ethanol
2-(Butylamino)ethanol
2-[(1,1-Dimethylethyl)amino]ethanol
2-(Cyclohexylamino)ethanol

---

Amines:

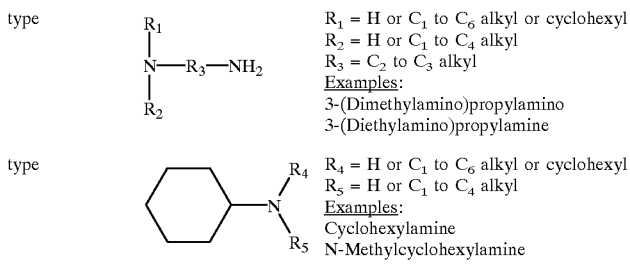

type
$R_1 = H$ or $C_1$ to $C_6$ alkyl or cyclohexyl
$R_2 = H$ or $C_1$ to $C_4$ alkyl
$R_3 = C_2$ to $C_3$ alkyl
Examples:
3-(Dimethylamino)propylamino
3-(Diethylamino)propylamine type
$R_4 = H$ or $C_1$ to $C_6$ alkyl or cyclohexyl
$R_5 = H$ or $C_1$ to $C_4$ alkyl
Examples:
Cyclohexylamine
N-Methylcyclohexylamine Alkanolamines:

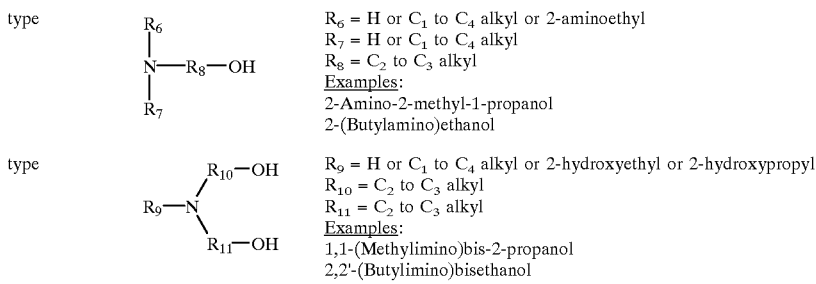

type
$R_6 = H$ or $C_1$ to $C_4$ alkyl or 2-aminoethyl
$R_7 = H$ or $C_1$ to $C_4$ alkyl
$R_8 = C_2$ to $C_3$ alkyl
Examples:
2-Amino-2-methyl-1-propanol
2-(Butylamino)ethanol type
$R_9 = H$ or $C_1$ to $C_4$ alkyl or 2-hydroxyethyl or 2-hydroxypropyl
$R_{10} = C_2$ to $C_3$ alkyl
$R_{11} = C_2$ to $C_3$ alkyl
Examples:
1,1-(Methylimino)bis-2-propanol
2,2'-(Butylimino)bisethanol

---

The most preferred amino- and/or hydroxyalkylamino compounds are selected from the group comprising
3-(Methylamino)propylamine
3-(Dimethylamino)propylamine
3-(Diethylamino)propylamine
Cyclohexaneamine
N-Methylcyclohexylamine
N-Ethylcyclohexylamine
2-[(2-Aminoethyl)amino]ethanol
1-Amino-2-propanol
1-(Methylamino)-2-propanol
1-(Dimethylamino)-2-propanol
1,1'-Iminobis-2-propanol
2,2'-Iminobisethanol
2,2'-(Methylimino)bisethanol
1,1'-(Methylimino)bis-2-propanol
2,2'-(Butylimino)bisethanol
2,2'-[(1,1-Dimethylethyl)imino]bisethanol
1,1',1"-Nitrilotris-2-propanol 2,2',2"-Nitdlotrisethanol Said inorganic acid(s) and/or derivatives thereof and/or carboxylic acid(s) of component a) according to this invention is (are) selected from:

---

| | |
|---|---|
| Inorganic acids: | Carbonic acid, monoalkali metal salts |
| | Orthophosphoric acid and derivatives thereof, including the monoalkali metal salts thereof |
| | Monofluorophosphoric acid |
| | Diphosphoric acid, including the dialkali metal salts thereof |

-continued

Examples:
Sodium hydrogen carbonate
Sodium dihydrogen orthophosphate

Carboxylic acids:

type    $R_{12}$—COOH    $R_{12}$ = $C_6$ to $C_8$ alkyl
Examples:
2-Ethylhexanoic acid
Octanoic acid type 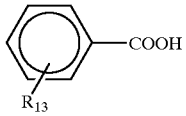 $R_{13}$ = H or $C_1$ to $C_4$ alkyl or —OH or —$NO_2$
Examples:
4-Nitrobenzoic acid
4-(1-Methylethyl)benzoic acid type    HOOC—$R_{14}$—COOH    $R_{14}$ = $C_6$ to $C_8$ alkylene
Examples:
1,6-Hexanedicarboxylic acid
1,8-Octanedicarboxylic acid The most preferred inorganic acid(s) and/or the derivates thereof and/or the carboxylic acid(s) and/or the derivatives thereof of component a) are selected from the group comprising Sodium hydrogen carbonate
Potassium hydrogen carbonate
Orthophosphoric acid
Sodium dihydrogen phosphate
Potassium dihydrogen phosphate
Diphosphoric acid
Sodium dihydrogen diphosphate
Potassium dihydrogen diphosphate
Monofluorophosphoric acid
n-Hexanoic acid
n-Heptanoic acid
n-Octanoic acid
n-Nonanoic acid
2-Ethylhexanoic acid
Isooctanoic acid
1,6-Hexanedicarboxylic acid
1,8-Octanedicarboxylic acid
Glycerophosphoric acid
D-Gluconic acid
Glucosemonocarboxylic acid
Benzoic acid
2-Hydroxybenzoic acid
4-Hydroxybenzoic acid
4-Nitrobenzoic acid
4-Methylbenzoic acid
4-(1-Methylethyl)benzoic acid
4-(1,1-Dimethylethyl)benzoic acid Suitable amounts of component a) according to this invention are between 8.0% to 80.0%, preferably between 25% to 50%, by weight, based on the weight of said aqueous corrosion-inhibiting composition.

Said surfactants of component b) according to this invention are preferably selected from the group comprising:

N-($C_8$ to $C_{22}$-Acyl)sarcosine, alkanolammonium or sodium salt, preferably N-Lauroylsarcosine, alkanolammonium or sodium salt and/or N-Cocoylsarcosine, alkanolammonium or sodium salt and/or N-Oleylsarcosine, alkanolammonium or sodium salt N-($C_8$ to C22-Acyl)-β-alanine, alkanolammonium or sodium salt, preferably N-Lauroyl-β-alanine, alkanolammonium or sodium salt and/or N-Cocoyl-β-alanine, alkanolammonium or sodium salt and/or N-Oleyl-β-alanine, alkanolammonium or sodium salt $C_8$ to $C_{22}$-Fatty acid monoethanolamide $C_8$ to $C_{22}$-Fatty acid diethanolamide 1-($C_6$ to $C_{12}$-Alkyl)-2-pyrrolidinone, preferably 1-Octyl-2-pyrrolidinone and/or 1-Dodecyl-2-pyrrolidinone fluoro-surfactants

EXAMPLES

N-Oleylsarcosine, Sodium Salt 1-Octyl-2-pyrrolidinone

Said alkanolammonium salts of the corresponding surfactant(s) are based on alkanolamines selected from 2-aminoethanol, 2-(methylamino)ethanol, 2-(butylamino)-ethanol, 2,2'-iminobisethanol, 2,2',2"-nitrilotrisethanol.

Suitable amounts of said surfactants of component b) according to this invention are 0.05% to 10.0%, preferably 0.5% to 5.0%, by weight, based on the weight of said aqueous corrosion-inhibiting composition.

Said water-based or water-thinnable organosilicone compound(s) according to this invention is (are) selected from:

silanes
alkylalkoxysilanes of the general formula $R_{15}$—Si—$(OR_{16})_3$
$R_{15}$=$C_4$ to $C_{16}$ alkyl
$R_{16}$=$C_1$ to $C_3$ alkyl
oligomeric siloxanes and derivatives thereof
alkali siliconates Suitable amounts of said water repellent of component c), i.e. of the organosilicone compound(s) according to this invention are from about 0.1% to 50.0%, preferably 1.0% to 20.0%, and more preferably 5.0% to 15.0%, by weight, based on the weight of said aqueous corrosion-inhibiting composition.

The compositions according to the present invention may also comprise further components such as biocidal agents, stabilizers etc. as desired.

The disclosed corrosion-inhibiting compositions are showing a fast reduction of the corrosion rate of corroding reinforcing steel, as well as excellent corrosion-inhibition properties, ensuring the protection of reinforcing steel embedded in hardened concrete, thus securing the expected service life of such concrete structures. Furthermore, the application of said corrosion-inhibiting compositions to a hardened reinforced concrete structure implies the following advantages:

not labor-intensive moderate overall cost of rehabilitative treatment easy application even on structured concrete surfaces not influencing the aspect of the concrete surface.

A further aspect of the present invention is a novel method for the rehabilitative reduction of the corrosion rate of corroded steel reinforcements embedded in a hardened, reinforced concrete structure as well as for the precautionary, protective corrosion inhibition of uncorroded steel reinforcements embedded in a hardened, reinforced concrete structure by impregnating the surface of said concrete structure with the novel aqueous corrosion-inhibiting compositions set forth above.

According to said novel method, a solution and/or an emulsion and/or a micro-emulsion comprising the following 3 components is applied onto the hardened, reinforced concrete structure, whereby said solution and/or an emulsion and/or a micro-emulsion penetrates into the concrete material to reach the steel reinforcements:

a) One or more amino- and/or hydroxyalkylamino compound(s), partially or completely neutralized with one or more inorganic acid(s) and/or derivatives thereof and/or aliphatic carboxylic- and/or aromatic carboxylic acid(s), in an amount sufficient to inhibit corrosion of said steel reinforcement, whereby said organic acid(s) contains one or more carboxylic groups and may additionally contain one or more hydroxyl groups.

b) One or more surfactant(s) providing an enhanced wetting and penetration capability by altering the surface tension.

c) One or more water-based or water-thinnable water repellent agent(s) selected from the group of organo-silicones.

In situations where the reinforcing steel embedded in a hardened concrete structure has undergone corrosion or is susceptible to corrosion, it is desirable to have a corrosion-inhibiting composition available which can be applied to the surface of the concrete structure and thereafter penetrates inwardly to protect the reinforcing steel. The method according to the present invention includes the improvement of an existing corrosion-inhibiting protection of reinforcing steel embedded in a hardened concrete structure which is containing corrosion inhibitors added as an admixture to the concrete at the time the concrete was cast.

According to a preferred embodiment, in a first step, one or more coats of said aqueous corrosion-inhibiting composition consisting of the components a, b) and c) are applied as a pretreatment to the surface of a hardened reinforced concrete structure, optionally followed by an impregnation performed with one or more coats consisting of component c).

Subsequent to the disclosed surface-applied treatment, corrosion-inhibiting compounds penetrate into the concrete and adsorb chemically on the surface of both, corroding and non-corroding reinforcing steel. The rates of penetration of said corrosion-inhibiting compounds are sufficient to cause a reduction of the corrosion rate of corroded reinforcing steel as well as to protect uncorroded reinforcing steel over extended periods of time.

In a preferred embodiment of the present invention, the corrosion-inhibiting solution or emulsion or microemulsion is applied on the concrete surface in several coats by brush, by paint roller or by a spraying device in a total amount of 200–2000 g/m², preferably 300–1 000 gam².

A final aspect of the present invention is the use of the above set forth novel compositions for the rehabilitative reduction of the corrosion rate of corroded steel reinforcements embedded in a hardened, reinforced concrete structure as well as for the precautionary, protective corrosion inhibition of uncorroded steel reinforcements embedded in a hardened, reinforced concrete structure by impregnation of said hardened reinforced concrete structure.

The following examples I–V show that such compositions are able to reduce the corrosion rate of corroding reinforcing steel to a negligible value (repassivation effect) as well as to protect uncorroded steel from corrosion. They are included for the purpose of illustrating the invention, and are not intended to limit the scope of the invention in any manner. All component percentages are by weight unless otherwise indicated.

EXAMPLES

In the following examples the effect of the corrosion-inhibiting compositions No. I–V according to the invention on reinforcing steel will be set forth.

The following corrosion-inhibiting compositions were used to perform the tests:

TABLE 1

| Ingredients [%] (w/w) | Composition No. | | | | |
| --- | --- | --- | --- | --- | --- |
| | I | II | III | IV | V |
| 3-(Diethylamino)propylamine | 4.2 | — | — | 12.9 | 5.4 |
| N-Ethylcyclohexylamine | — | 2.8 | 2.1 | — | — |
| 1-Amino-2-propanol | 12.0 | — | 11.6 | — | 12.0 |
| 1-(Dimethylamino)-2-propanol | — | — | — | 2.8 | — |
| 2-Aminoethanol | — | 12.7 | — | — | — |
| 2-(Butylamino)ethanol | — | — | 3.2 | — | — |
| 4-Nitrobenzoic acid | — | — | — | 5.7 | — |
| Octanoic acid | — | 4.9 | 4.8 | 8.6 | — |
| Monopotassium phosphate | 13.8 | 9.6 | 8.3 | — | 12.6 |
| N-Lauroylsarcosine, sodium salt | 0.4 | 0.5 | — | 1.2 | — |
| N-Cocoyl-β-alanine, sodium salt | 0.5 | 0.6 | 0.4 | — | 1.0 |
| 1-Octyl-2-pyrrolidinone | 0.1 | 0.1 | 0.1 | 0.2 | 0.2 |
| Water | 69.0 | 68.8 | 69.5 | 68.4 | 68.8 |
| Σ | 100.0 | 100.0 | 100.0 | 100.0 | 100.0 |

EXAMPLE I

In this example the influence of the corrosion-inhibiting composition No. I according to the invention in comparison to that of 1-amino-2-propanol on mild steel specimens was investigated by means of potentiodynamic polarization measurements, performed in aqueous, chloride containing solutions. The measurements were carried out using a potentiostat/galvanostat with scan option and a Camec II station.

Test conditions:

$U_{max} \pm 5$ V, $v_u = 1$–8350 mV/min.

working electrodes: polished steel plates (mild steel ST 37)

10 mV/sec.

concentration of corrosion-inhibiting compounds: 2.0% based on solids

The test solution was neither stirred, nor degased. The electrode was conditioned for one hour at i=0.0 mA/cm², then the polarization was started.

Test period: 1 hour; $i_{max}$=0.5 mA/cm², $j_o$ and $J_u$ depending on currents ($i_{max}$=30–50 mA) After a further conditioning at i=0.0 mA/cm² for 30 minutes, the CV was performed in cathodic direction during 30 minutes.

TABLE 2

Cyclic voltammetry at a mild steel electrode
(calcium hydroxide saturated + 0.09 M sodium chloride)

| Specimen | Dosage [%] w/w | Pitting potential vs SCE ø 3 scans [mV] | Repassivation potential vs SCE ø 3 scans [mV] |
|---|---|---|---|
| Control | — | +240 | −540 |
| 1-Amino-2-propanol | 6.5 | +660 | −430 |
| Composition No. I | 6.5 | +1050 | +890 |

As can be seen from the data in Table 2, the composition No. I performs substantially better than 1-amino-2-propanol as well as the control, showing more positive values of both, the pitting and the repassivation potentials.

Example 11

In the following three examples IIA–IIC the effect of the corrosion-inhibiting compositions No. II, No. III and No. IV respectively on precorroded reinforcing steel is set forth.

Pieces of rebars of job site quality were corroded in a 30% sodium chloride solution to a potential of approximately −500 mV vs. a silver/silver chloride half cell (SSE). The corroded specimens were rinced with tap water and then dipped into aqueous test solutions showing different initial pH values each and containing 0.000 or 0.001 or 0.010 moles per litre sodium chloride respectively.

After determination of the resulting corrosion potentials vs. SSE, 2.0% w/w of the corrosion-inhibiting compositions No. II, No. III and No. IV respectively according to the invention were added to the test solutions. Subsequently the potentials vs. SSE of the test specimens were measured in function of time and the resulting shifts of the potentials were calculated.

Example IIA

This example shows the effect of the corrosion-inhibiting compostion No. II according to the invention on precorroded reinforcing steel in comparison to those of 2-aminoethanol and control specimens respectively (temperature: 25° C.; dosage of corrosion-inhibiting composition No. II and of a 2-aminoethanol (solution 30% w/w) respectively: 2.0% w/w.

TABLE 3

Average shift of potential of precorroded reinforcing steel, 9 months after addition of corrosion-inhibiting composition; initial pH value of test solution: 10.0

| Specimen | Concentration of sodium chloride | Shift of potential |
|---|---|---|
| Control | 0.000 M | −4.4 mV |
| 2-Aminoethanol (aq.sol. 30% w/w) | 0.000 M | +494.7 mV |
| Composition No. II | 0.000 M | +517.5 mV |
| Control | 0.001 M | +8.0 mV |
| 2-Aminoethanol (aq.sol. 30% w/w) | 0.001 M | +482.1 mV |
| Composition No. II | 0.001 M | +568.9 mV |

Example IIB

This example illustrates the effect of the corrosion-inhibiting composition No. III according to the invention on precorroded reinforcing steel in comparison to those of 1-amino-2-propanol and control specimens respectively (temperature:250° C.; dosage of corrosion-inhibiting composition No III and of 1-amino-2-propanol (solution 30% w/w) respectively: 2.0% w/w.

TABLE 4

Average shift of potential of precorroded reinforcing steel, 9 months after addition of corrosion-inhibiting composition; initial pH value of test solution: 12.0

| Specimen | Concentration of sodium chloride | Shift of potential |
|---|---|---|
| Control | 0.000 M | −4.4 mV |
| 1-Amino-2-propanol (aq.sol. 30% w/w) | 0.000 M | +380.5 mV |
| Composition No. III | 0.000 M | +450.2 mV |
| Control | 0.001 M | +4.6 mV |
| 1-Amino-2-propanol (aq.sol. 30% w/w) | 0.001 M | +184.0 mV |
| Composition No. III | 0.001 M | +296.5 mV |

Example IIC

This example shows the effect of the corrosion-inhibiting composition No. IV according to the invention on precorroded reinforcing steel in comparison to those of 3-(diethylamino)propylamine and control specimens respectively (temperature: 250° C.; dosage of corrosion-inhibiting composition No. IV and of 3-(diethylamino)propylamine (solution 30% w/w) respectively: 2.0% w/w.

TABLE 5

Average shift of potential of precorroded reinforcing steel, 9 months after addition of corrosion-inhibiting composition; initial pH value of test solution: 13.0

| Specimen | Concentration of sodium chloride | Shift of potential |
|---|---|---|
| Control | 0.000 M | −45.5 mV |
| 3-(Diethylamino)propylamine (aq.sol. 30% w/w) | 0.000 M | +127.2 mV |
| Composition No. IV | 0.000 M | +196.3 mV |
| Control | 0.010 M | −210.5 mV |
| 3-(Diethylamino)propylamine (aq.sol. 30% w/w) | 0.010 M | −97.6 mV |
| Composition No. IV | 0.010 M | −20.8 mV |

As can be seen from the data in Tables No. 3 to 5, the compositions No. II, No. III as well as No. IV cause considerably larger shifts of the potentials of the precorroded reinforcing steel specimens in direction of more positive values, relative to both, the respective amino compounds alone and the control specimens.

Example III

This example demonstrates the corrosion-inhibiting effect of the compositions No. I and No. II as well as of a blend of composition No. I with a organosilicone compound according to the invention on corroded reinforcing steel embedded in hardened reinforced concrete. 550 g/m² of composition No. I and II, as well as of a blend of 85% (w/w) of composition No. I+15% (w/w) of an aqueous emulsion of organosilicone based water repellent agents respectively were applied by paint roller according to the invention to carbonated concrete slabs containing corroded rebars (average carbonation depth: 25 mm; average concrete cover: 17 mm; chloride concentration: 22 ppm ; storage of test specimens during test period: weather-exposed).

TABLE 6

| Measurements (performed by LP device)* Specimen | Prior to application of respective compositions (t = 0 months) | | After application of respective compositions (t = 17 months) | |
|---|---|---|---|---|
| | Corrosion rate [$\mu$A/cm$^2$] | Potential CSE [mV] | Corrosion rate [$\mu$A/cm$^2$] | Potential CSE [mV] |
| Control/1 | 0.228 | −372 | 0.251 | −409 |
| Control/2 | 0.173 | −340 | 0.184 | −361 |
| Composition No. I/1 | 0.201 | −331 | 0.072 | −228 |
| Composition No. I/2 | 0.247 | −392 | 0.098 | −306 |
| Composition No. II/1 | 0.264 | −356 | 0.117 | −307 |
| Composition No. II/2 | 0.196 | −404 | 0.079 | −331 |
| 85% (w/w) Composition No. I + 15% (w/w) organosilicone emulsion 30% (w/w)/1 | 0.239 | −388 | 0.083 | −251 |
| 85% (w/w) Composition No. I + 15% (w/w) organosilicone emulsion 30% (w/w)/2 | 0.182 | −365 | 0.049 | −204 |

*Measurements of corrosion rates listed in this specification were performed by a "Geocor 6" corrosion rate meter, manufactured by Geocisa S.A., Madrid, Spain. The "Geocor 6" device measures the corrosion rate of reinforcing steel embedded in concrete by the "linear polarization" technique (LP).

As can be seen from the data in Table 6, the compositions No. I and No. II, as well as a blend of 85% w/w composition No. I+15% w/w organosilicone emulsion (30% w/w) caused considerable reductions of the corrosion rates of the reinforcing steel embedded in carbonated concrete. After 17 months of weather-exposed storage of the specimens the average corrosion rates were 42% [composition No. II], 38% [composition No. I] and 31% [85% w/w composition No. I+15% w/w organosilicone emulsion (30% w/w) ] respectively, based on the corresponding initial average corrosion rates, whereas the average corrosion rate of the control increased to 108% of the corresponding average initial value. The results above show that the performance of corrosion inhibitors can be improved further by blending with organosilicone compounds.

Example IV

This example demonstrates the effect of the corrosion-inhibiting composition No. III on corroded reinforcing steel embedded in hardened reinforced concrete according to the invention. 600 g/m$^2$ of composition No. III were applied by paint roller to corroded, carbonated concrete slabs containing chlorides (average concrete cover 25–38 mm; average carbonation depth: 31 mm; average chloride content, based on the cement weight: 0.74%; relative humidity during test period: 50–90%).

As can be seen from the data in Table 7, after a test period of 15 months the composition No. III caused an average reduction of the corrosion rates of the steel reinforcements embedded in hardened concrete to approx. 46% of the initial average corrosion rate, whereas the average corrosion rate of the control increased to 104% of the corresponding average initial value.

Example V

The following example illustrates the influence of the corrosion-inhibiting composition No. V according to the invention on the corrosion rate of corroded reinforcing steel embedded in reinforced concrete slabs. The concrete surface to be treated was washed using a high pressure jet of water. After drying, 450 g/m$^2$ of composition No. V were applied by paint roller to the surface of the carbonated concrete slabs. Storage of test specimens during test period: weather-exposed.

TABLE 7

| Measurements (LP device) Specimen No. | Results before application of composition No. III (t = 0 months) | | Results after application of composition No. III (t = 15 months) | |
|---|---|---|---|---|
| | Corrosion rate [$\mu$A/cm$^2$] | Potential CSE [mV] | Corrosion rate [$\mu$A/cm$^2$] | Potential CSE [mV] |
| control/1 | 0.404 | −417 | 0.411 | −431 |
| control/2 | 0.487 | −390 | 0.495 | −373 |
| Composition No. III/1 | 0.453 | −403 | 0.202 | −294 |
| Composition No. III/2 | 0.391 | −374 | 0.189 | −308 |

TABLE 8

| Measurements (LP device) Specimen | Average corrosion rate [μA/cm²] | |
|---|---|---|
| | before application of composition No. V (t = 0 months) | after application of composition No. V (t = 10 months) |
| Control/1 | 0.238 | 0.251 |
| Control/2 | 0.275 | 0.306 |
| Composition No. V/1 | 0.247 | 0.089 |
| Composition No. V/2 | 0.302 | 0.167 |
| Composition No. V/3 | 0.214 | 0.060 |

As can be seen from the data in Table 8, after a test period of 10 months the composition No. V caused an average reduction of the corrosion rates of the steel reinforcements embedded in hardened concrete to approx. 40% of the initial average corrosion rate, whereas the average corrosion rate of the control increased to 108% of the corresponding average initial value.

What is claimed is:

1. A composition for the rehabilitative reduction of the corrosion rate of corroded steel reinforcerments embedded in a hardened, reinforced concrete structure as well as for the precautionary, protective corrosion inhibition of uncorroded steel reinforcements embedded in a hardened, reinforced concrete structure by inpregnation of said hardened reinforc concrete structure, wherein said corrosion-inhibiting composition comprises a solution and/or an emulsion and/or a micro-emulsion of a) one or more amino- and/or hydroxyalkylamino compound(s), partially or completely neutralized with one or more acid(s) selected from the group consisting of carbonic acid, phosphoric acid, diphosphoric acid, monofluorophosphoric acid, and partial salts thereof, glycerophosphoric acid, glucosemonocarboxylic acid, $R_{12}$—COOH wherein $R_{12}$ is a linear or branched $C_6$ to $C_8$ alkyl group,

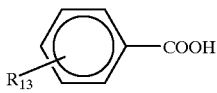

wherein $R_{13}$ is H or a linear or branched $C_1$ to $C_4$ ally, —OR or —$NO_2$ group, HOOC—$R_{14}$—COOH wherein $R_{14}$ is a $C_6$ to $C_8$ alkylene group, and mixtures thereof, whereby said carboxylic acid(s) may additionally contain one or more hydroxyl groups, in an amount sufficient to inhibit corrosion of said steel reinforcement, and b) one or more surfactant(s) providing an enhanced wetting and penetration capability by altering the surface tension, and c) one or more water-based or water-thinnable water repellent agent(s) selected from organosilanes and/or organosiloxanes.

2. Composition according to claim 1, wherein the amount of the component a) represents from about 8.0% to 80.0% by weight based on the weight of said aqueous solution or emulsion or microemulsion.

3. Composition according to claim 1, wherein the amount of the component b) represents from about 0.05% to 10.0% by weight based on the weight of said aqueous solution or emulsion or microemulsion.

4. Composition according to claim 1, wherein the amount of component c) represents about 0.1% to 50.0% by weight, based on the weight of said aqueous solution or emulsion or microemulsion.

5. Composition according to claim 1, wherein the amino- and/or hydroxyalkylamino compound is 2-[(2-Aminoetlhyl)amino]ethanol;
1-Amino-2-propanol;
1-(Methylamino)-2-propanol;
1-(Dimethylamino)-2-propanol;
1-(Ethylamino)-2-propanol;
3-Amino-1-propanol;
2-Aminoethanol;
2-(Methylaimno)ethanol;
2-(Dimethylanino)ethanol;
2-(Ethylamino)ethanol;
2-(Diethylamino)ethanol;
2-(Butylamino)ethanol;
2-[(1,1-Dimethylethyl)amino]ethanol;
1,1'-Iminobis-2-propanol;
2,2'-Iminobisethanol;
2,2'-(Methymlaimo)bisethanol;
1,1'-(Metylimino)bis-2-propanol;
2,2'(Butylimino)bisethanol;
1,1'1"-Nitrilotris-2-propanol;
2,2'2"-Nitrilotrisethanol;
or mixtures thereof.

6. Composition according to claim 1, wherein the acid(s) arc

Orthophosphoric acid;
Diphosphoric acid;
Monofluorophosphofrio acid;
n-Heptanoic acid;
n-Octanoic acid;
2-Ethylhexanoic acid;
Isooctanoic acid;
1,8-Octanedicarboxylic acid;
D-Gluconic acid;
Glucosemonocarboxylic acid;
Benzoic acid;
or mixtures thereof.

7. Composition according to claim 1, wherein the component b) is

N-($C_8$ to $C_{22}$-Acyl)-β-alanine, an alkanolammoniun or sodium salt thereof;
N-Cocoyl-β-alanine, an alkanolammonium or sodium salt thereof,
N-Oleyl-β-alaninc, an alkanolammonium or sodium salt thereof,
$C_8$ to $C_{22}$-Fatty acid monoethanolamide;
$C_8$ to $C_{22}$-Fatty acid diethanolamide;
1-($C_6$ to $C_{12}$-Alkyl)-2-pyrrolidinone;
or mixtures thereof.

8. Composition according to claim 7, wherein the alkanolamine compound of said surface-active alkanolammonium salts is 2-Aminoethanol;
2(Methylamino)ethanol;
2-(Butylamino)ethanol;
2,2'-Iminobisethanol; or
2,2',2"-Nitrilotrisethanol;
or mixtures thereof.

9. Composition according to claim 1, wherein said water-based or water-thinnable organosilanes and/or organosiloxancs of component c) is one or more silanes, one or more oligomeric siloxanes, or mixtures thereof.

10. Composition according to claim 9, wherein said silane is an alkyltrialkoxysilane having the formula R'-Si(OR")$_3$, wherein R' is a $C_4$ to $C_{16}$-alkyl group and R" is a $C_1$ to $C_3$-alkyl group.

11. Composition according to claim 1, wherein said organosilanes and/or organosiloxenes a mixture of one or more alkylalkoxysilanes and one or more oligomeric siloxanes and/or one or more polysiloxanes or is a mixture of one or more oligomeric siloxanes and one or more polysiloxanes or is a mixture of one or more alkalisiliconates and one or more oligomeric siloxanesand/:or derivates thereof-and/or one or more polysiloxanes and/or derivates thereof.

12. Composition according to claim 1, wherein it comprises a water-soluble dye to visualize the area on a hardened concrete surface upon which said corrosion-inhibiting composition is applied.

13. Composition according to claim 1, wherein the amount of the component a) represents from about 25.0% to 50.0% by weight based on the weight of said aqueous solution or emulsion or microemulsion.

14. Composition according to claim 1, wherein the amount of the component b) represents from about 0.5% to 5.0% by weight based on the weight of said aqueous solution or emulsion or microemulsion.

15. Composition according to claim 1, wherein the amount of component c) represents about 1.0% to 20.0% by weight based on the weight of said aqueous solution or emulsion or microemulsion.

16. Composition according to claim 1, wherein the amount of component c) represents about 5.0% to 15.0% by weight based on the weight of said aqueous solution or emulsion or microemulsion.

17. Composition according to claim 1, wherein the component b) is
   N-Lauroyl-β-alanine, an alkanolammonium or sodium salt thereof; or
   1-Octyl-2-pyrrolidinone and/or 1-Dodecyl-2-pyrrolidinone fluorosurfactants.

18. Composition according to claim 1, wherein it comprises a water-soluble dye having a low light fastness to visualize the area on a hardened concrete surface upon which said corrosion-inhibiting composition is applied.

* * * * *